United States Patent [19]
Johannesson

[11] Patent Number: 5,816,291
[45] Date of Patent: Oct. 6, 1998

[54] SHOCK ABSORBER FOR LIQUID CONDUITS

[75] Inventor: Leif Johannesson, Asarum, Sweden

[73] Assignee: LJ Oljeledningar AB, Sweden

[21] Appl. No.: 737,475

[22] PCT Filed: May 12, 1995

[86] PCT No.: PCT/SE95/00526

§ 371 Date: Nov. 18, 1996

§ 102(e) Date: Nov. 18, 1996

[87] PCT Pub. No.: WO95/32387

PCT Pub. Date: Nov. 30, 1995

[30] Foreign Application Priority Data

May 20, 1994 [SE] Sweden ................................ 9401746

[51] Int. Cl.⁶ .................................................... F16L 55/04
[52] U.S. Cl. ................................ 138/30; 138/46; 138/31; 137/513.5; 137/543.15
[58] Field of Search .................................. 138/30, 26, 31, 138/45, 46; 137/513.3, 513.5, 511, 493.2, 207, 543.15

[56] References Cited

U.S. PATENT DOCUMENTS

| | | | |
|---|---|---|---|
| 2,774,381 | 12/1956 | Buri | 138/31 |
| 2,807,279 | 9/1957 | Presnell | 137/513.5 X |
| 3,032,145 | 5/1962 | Katz | 137/493.3 X |
| 3,088,492 | 5/1963 | Mericier | 137/513.3 X |
| 3,170,481 | 2/1965 | Presnell | 137/513.3 X |
| 3,420,273 | 1/1969 | Greer | 137/513.3 X |
| 3,493,001 | 2/1970 | Bevandich | 137/513.3 X |
| 3,746,038 | 7/1973 | Simmons | 137/513.5 |
| 3,782,418 | 1/1974 | Zahid | 138/30 X |
| 3,794,077 | 2/1974 | Fanshier | 137/513.3 |
| 3,857,413 | 12/1974 | Zahid . | |
| 3,877,489 | 4/1975 | Louie et al. | 137/513.3 X |
| 4,109,767 | 8/1978 | Nandyal et al. | 137/493.3 X |
| 4,172,465 | 10/1979 | Dashner | 137/543.15 X |
| 4,174,731 | 11/1979 | Sturgis et al. | 137/513.3 X |
| 4,456,029 | 6/1984 | McCrum | 137/543.15 X |
| 4,596,263 | 6/1986 | Snider | 137/493.3 X |
| 4,628,957 | 12/1986 | Hofer et al. | 137/493.3 |
| 4,683,599 | 8/1987 | Rief | 137/513.5 X |
| 4,838,462 | 6/1989 | Corniea | 137/493.3 X |

FOREIGN PATENT DOCUMENTS 390565  12/1976  Sweden .

Primary Examiner—Patrick F. Brinson
Attorney, Agent, or Firm—Burns, Doane, Swecker & Mathis, L.L.P.

[57] ABSTRACT

A shock absorber in a liquid conduit (4) is provided. The shock absorber comprises a closed liquid tank (10), which is partly filled with gas and has a joint means (11) connected to the conduit (4). Via the joint means, liquid can flow to and from the tank (10) for compressing and decompressing the gas. The joint means (11) comprises a check valve means which, in its forward direction, permits a substantially free liquid flow from the conduit (4) to the tank and, in its rearward direction, permits throttled liquid flow from the tank to the conduit.

6 Claims, 3 Drawing Sheets

5,816,291

SHOCK ABSORBER FOR LIQUID CONDUITS

TECHNICAL FIELD

The present invention relates to a shock absorber in a liquid conduit, said shock absorber comprising a closed liquid tank which is partly filled with gas and has a joint means which is connected to the conduit and through which liquid can flow to and from the tank for compressing and decompressing the gas.

BACKGROUND OF THE INVENTION

In most conduits through which liquids flow, shocks arise when quickly throttling or shutting off the liquid flow. In case of large amounts of liquid flowing through a conduit of a relatively small diameter, these shocks can be so powerful as to break the conduit. Therefore, one usually tries, if possible, to completely avoid shocks by slow throttling or shutting off.

Since it is not always possible to achieve such slow throttling or shutting off, various devices for shock absorbing are available, which are intended to communicate with a conduit through which liquid flows. Generally, the devices comprise some sort of resilient member which, in case of a shock in the conduit, owing to its resilience damps the force of the shock.

This resilient member can be, for instance, a compression spring, which actuates a piston which is movably arranged in a cylinder connected to the conduit, a compressible, gas-filled rubber pad in such a cylinder, or, in its very simplest form, a certain amount of gas which is held in such a cylinder and which is pressurised by the liquid flowing through the conduit.

The above-mentioned piston arrangement suffers from the drawback that it is relatively expensive to manufacture a cylinder with a piston mounted therein in a movable and sealed manner, and that extensive and, thus, costly dismounting is required for inspection. The arrangement comprising a compressible pad of, for instance, rubber, suffers from the drawbacks that the material of the pad can be attacked by or react with various liquids, and that the pad can be punctured and consequently loose its function. These two drawbacks make frequent check-ups of the function of the compressible pad necessary, which results in increased operating costs and relatively long stoppages.

Also the above-mentioned simple solution, which is briefly described in the introductory part, is impaired by a serious deficiency. Especially when supplying petroleum products through conduits, it has been found that there is a tendency that the gas held in the liquid tank or the cylinder disappears in course of time, among other things owing to frothing. Additional gas must therefore be supplied at relatively frequent intervals, which however is not a very efficient solution, especially for extensive pipeline systems with a plurality of shock absorbers.

OBJECT OF THE INVENTION

In consideration of the drawbacks of prior art solutions, the object of the present invention is to improve a shock absorber of the type mentioned by way of introduction in such a manner that neither frequent functional check-ups nor additional gas supply is required.

SUMMARY OF THE INVENTION

In a shock absorber of the type mentioned by way of introduction, this object is achieved by a check valve means arranged in the joint means and adapted to permit, in its forward direction, a substantially free liquid flow from the conduit to the tank and, in its rearward direction, a throttled liquid flow from the tank to the conduit.

Various experiments carried out by the applicant have shown that the throttling of the liquid flow from the tank to the conduit provided by means of the inventive shock absorber implies that gas bubbles, which, during the absorption of a shock, are taken up by the liquid, again have time to leave the liquid before it flows from the liquid tank back to the conduit. Especially in the petroleum trade, in which heavy oils are frequently conveyed at high pressure through long pipelines, the inventive shock absorber has been found to function without faults in the above-mentioned experiments.

In the inventive shock absorber, the joint means preferably comprises a tubular member, and the check valve means arranged in the joint means comprises a valve head having a smaller cross-sectional area than the tubular member of the joint means in order to permit, in a first position, in which the valve head is inserted into the tubular member, the throttled liquid flow in the rearward direction. Thanks to this solution, there is no risk that the valve head of the check valve means is broken against any valve seat. In practise, check-ups of the function of the check valve means are thus not necessary.

According to a preferred embodiment of the invention, the check valve means comprises a rod, on which the valve head is movable between said first position and a second position, in which the valve head is moved out of the tubular member of the joint means so as to allow said substantially free liquid flow in the forward direction. By movably arranging the valve head on a rod, both mounting and, if required, replacement of the valve head are facilitated, since this can be made readily accessible via the joint means.

Preferably, the valve head is clamped on the rod between helical spring means which are arranged to bias the valve head towards said first position. The advantage of such an arrangement is that the valve head thus cannot hit any fixed abutment that could damage the valve head.

BRIEF DESCRIPTION OF THE DRAWINGS

A preferred embodiment of the invention will be described in more detail below with reference to the accompanying drawings in which.

DESCRIPTION OF THE PREFERRED EMBODIMENT

Figure 1:
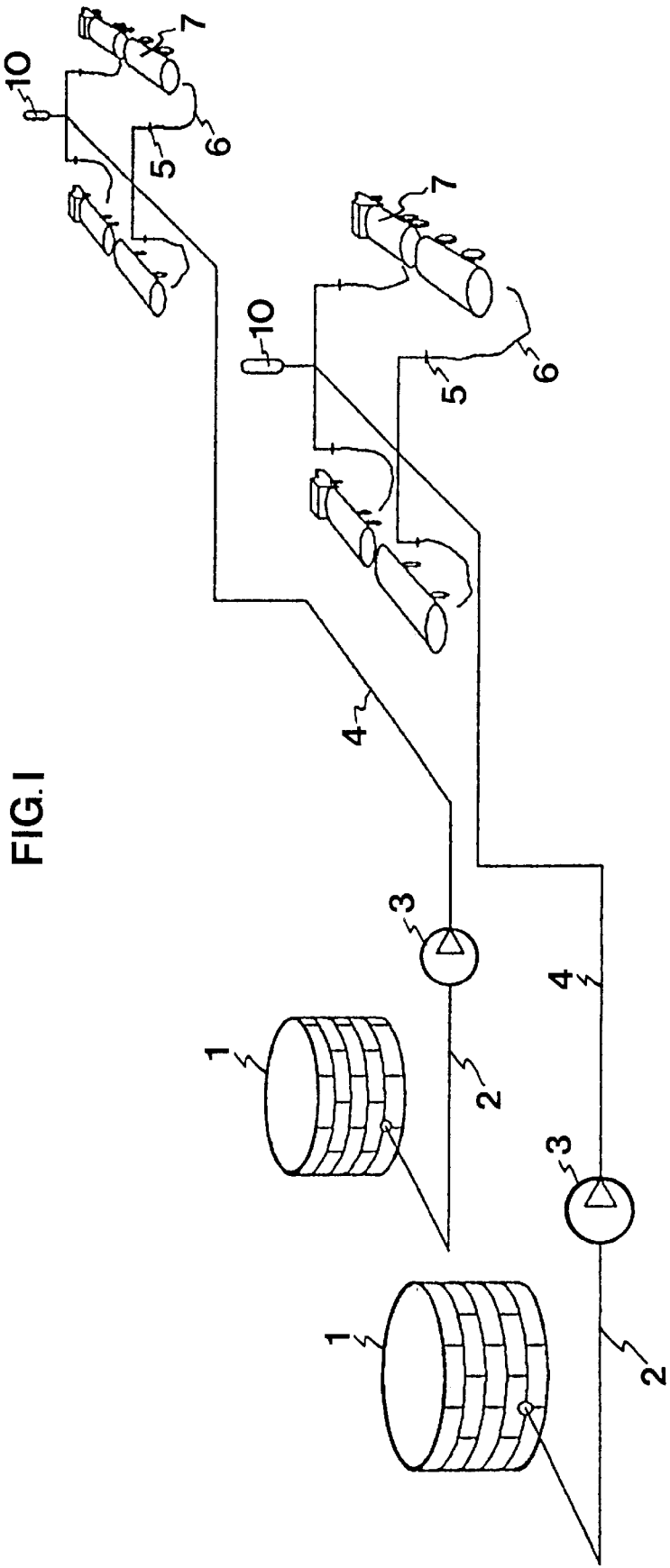
FIG. 1 is a perspective view schematically illustrating pipeline systems in which the inventive shock absorber is used.

The shock absorber illustrated in the drawings is intended for use in a pipeline system in an oil port. The pipeline system comprises an oil storage tank 1, from which an oil pipe 2 leads to a pump 3. The pump 3 pressurises the oil coming from the oil storage tank 1 and supplies it through a pressure pipe 4 up to shut-off valves 5. Flexible hoses 6 are connected to the shut-off valves and are adapted to be coupled to tank lorries 7 for filling thereof.

Because of the expense, one strives to reduce as far as possible the time needed for the filling operation. The oil is therefore pumped at high pressure, which causes a powerful shock, i.e. a sudden pressure increase, in the pressure pipe 4 when the flow of oil is quickly shut off by means of a shut-off valve 5 on termination of the filling of a tank lorry 7. The shock depends on the inertia of the oil flowing through the pressure pipe 4.

In order to absorb the shock, there is arranged at the end of each pressure pipe 4 a shock absorber 10 according to the invention. This will be described in more detail below with reference to FIGS. 2 and 3.

The inventive shock absorber comprises a closed tank 10 which is preferably made of stainless steel and provided, at its bottom, with a joint pipe 11. By means of the joint pipe 11, which below has a pipe flange 12, the liquid tank 10 can readily be fixedly connected, by bolts 13, to the pressure pipe 4, which to this end comprises a branch pipe 8 and, arranged thereon, a pipe flange 9.

In the illustrated embodiment, the joint pipe 11 extends a distance into the liquid tank 10 and its portion located in the actual tank 10 is formed with opposed vertical slits 14, through which the joint pipe 11 freely, i.e. more or less unimpededly, communicates with the liquid tank 10. At the top, the joint pipe 11 is closed by a terminal lid 15 which is welded thereto.

In its centre, the terminal lid 15 has a recess, in which a vertical rod 16 is fixed. The rod 16 extends down through substantially the entire joint pipe 11 and is below fitted with an external screw thread.

The rod 16 is arranged to support a displaceable valve head 17 which has a smaller cross-sectional area than the joint pipe 11 and thus, together with this, forms a circumferential annular gap 18.

The valve head 17 is mounted between an upper helical spring 19, which like the valve head is mounted on the rod and engages the underside of the terminal lid 15 and the upper side of the valve head 17, and a lower helical spring 20, which is also mounted on the rod and engages the underside of the valve head 17 and the upper side of a locking nut 21, which is screwed from below onto the rod. The two springs 19, 20 place the valve head 17 in the position shown in FIG. 2 approximately on a level with the bottom of the liquid tank 10, when there is no difference in pressure on both sides of the valve head 17.

When pressurised oil flows through the pressure pipe 4, also part of this oil is pressed through the branch pipe 8 and the joint pipe 11 into the liquid tank 10. Gas included in the top of the tank is then compressed. If necessary, gas can be supplied via a gas filling pipe 22 and a gas tap 23. The pressure in the liquid tank can be monitored by means of a pressure gauge 24.

Figure 2:
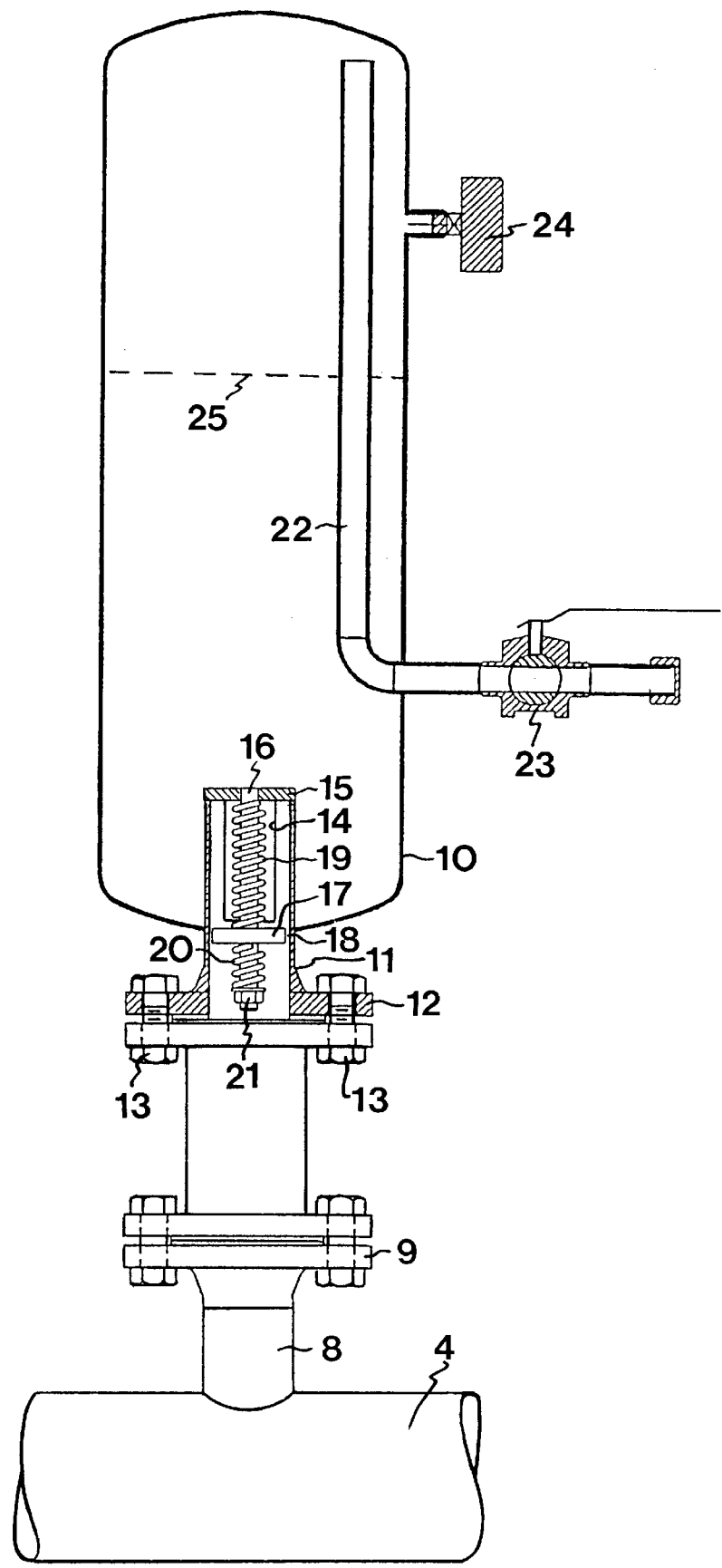
FIG. 2 is a partly sectional view of the inventive shock absorber in a first operational position.

In FIG. 2, reference numeral 25 indicates a suitable liquid level at which pressure prevails in the pressure pipe 4 and pressure equilibrium prevails on both sides of the valve head 17.

Figure 3:
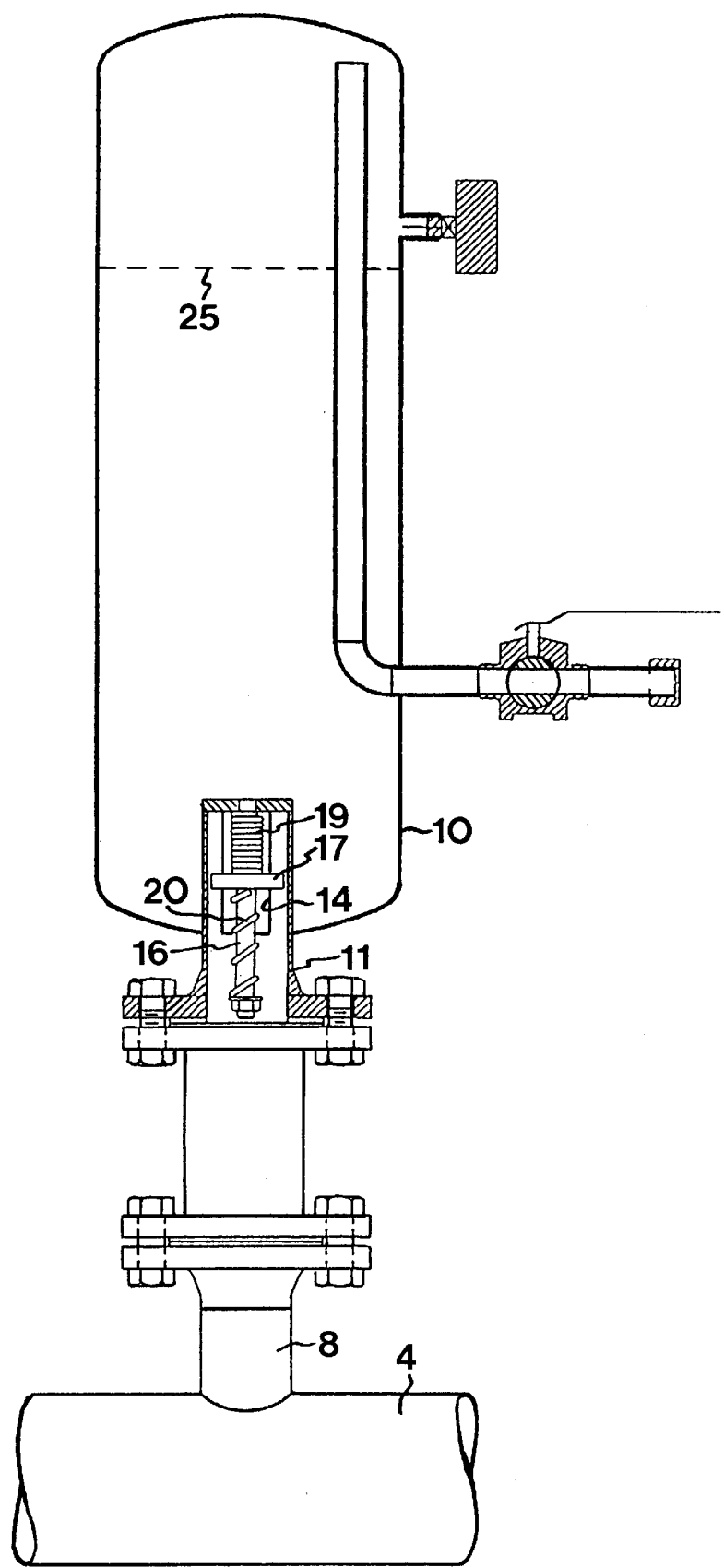
FIG. 3 is a partly sectional view of the inventive shock absorber in a second operational position.

In case of a sudden pressure increase in the pressure pipe 4, in which case the valve head is moved upwards by the oil flow to the position shown in FIG. 3, an additional amount of oil quickly flows into the liquid tank 10 through the two slits 14. As is evident from FIG. 3, the oil level 25 in the liquid tank 10 then rises to a higher level than in case of pressure equilibrium, and the gas is further compressed. As soon as the actual shock has gradually disappeared, the compressed gas begins again to press oil out of the liquid tank 10. Then the valve head 17 quickly returns to the position shown in FIG. 2, possibly after a few oscillations well damped by the two springs 19 and 20. The oil flowing back to the pressure pipe 4 now must pass the relatively narrow annular gap 18 between the valve head 17 and the inner wall of the joint pipe 11. Thus, the return flow is damped, and gas that has possibly been mixed with oil during the shock has time to rise again in the liquid tank 10 and consequently remains therein.

In experiments, it has been found that the inventive shock absorber functions well for a variety of liquid products. However, it is especially applicable to such liquid products as tend to form froth, i.e. for instance petroleum products such as diesel oil and fuel oil.

I claim:

1. A shock absorber in a liquid conduit, said shock absorber comprising:

a closed liquid tank which is partly filled with gas;

a joint means, the joint means being connected to the conduit, liquid flowing through the joint means to and from the tank for compressing and decompressing the gas; and a check valve means arranged in said joint means the check valve means permitting, in its forward direction, a substantially free liquid flow from the conduit to the liquid tank and, in its rearward direction, a throttled liquid flow from the tank to the conduit, wherein the liquid tank, the joint means, and the check valve means are non-elastomeric, wherein the joint means includes a tubular member, and the check valve means includes a valve head having a smaller cross-sectional area than the tubular member of the joint means such that the valve head permits, in a first position, in which the valve head is disposed in the tubular member, said throttled liquid flow in the rearward direction, wherein the check valve means includes a rod, the valve head being movable between said first position and a second position on the rod, the valve head being, in the second position, moved out of the tubular member of the joint means to allow said substantially free liquid flow in the forward direction, and wherein the valve head is clamped on the rod between helical spring means which are arranged to bias the valve head towards said first position.

2. The shock absorber as claimed in claim 1, wherein the valve head has an external circumference and the joint has an internal circumference larger than the external circumference of the valve head such that an annular gap is defined between the valve head and the joint to permit the throttled liquid flow from the tank to the conduit.

3. A shock absorber for a liquid conduit, comprising:

a closed tank;

a joint connected to the tank for connecting the tank to a conduit, the joint having a tubular portion at least partially extending into the tank, the tubular portion having at least one radial opening therein, the at least one radial opening being disposed in the tank;

a valve head movably disposed in the tubular portion of the joint, an exterior circumference of the valve head and an interior circumference of the tubular portion defining a space; and a spring arrangement disposed in the tubular portion of the joint for urging the valve head to a first position below the at least one radial opening, wherein when pressure of a liquid in the conduit exceeds pressure of a liquid in the tank, the valve head is moved against an urging force of the spring arrangement to a second position above the at least one radial opening.

4. The shock absorber as set forth in claim 3, further comprising a rod extending through the tubular portion of the joint, the valve head having a hole therein through which the rod extends, the spring arrangement including helical springs disposed around the rod and disposed above and below the valve head.

5. The shock absorber as set forth in claim 4, wherein a lid is attached to an upper end of the tubular portion of the joint and the rod is attached to the lid.

6. The shock absorber as set forth in claim 3, further comprising a gas pipe extending into the tank.

* * * * *